(12) United States Patent
Wang et al.

(10) Patent No.: US 7,488,554 B2
(45) Date of Patent: *Feb. 10, 2009

(54) BATTERY COVER ASSEMBLY FOR PORTABLE ELECTRONIC DEVICE

(75) Inventors: Xiaozhou Wang, Shenzhen (CN); Chia-Hua Chen, Tu-Chen (TW); Chih-Neng Ken, Tu-Chen (TW); BaoJiang Chen, Shenzhen (CN); Ying Liang Tu, Shenzhen (CN); XingHuang Luo, Shenzhen (CN)

(73) Assignees: Hong Fu Jin Precision Industry (Shen Zhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 902 days.

This patent is subject to a terminal disclaimer.

(21) Appl. No.: 10/840,980

(22) Filed: May 7, 2004

(65) Prior Publication Data
US 2004/0224220 A1 Nov. 11, 2004

(30) Foreign Application Priority Data
May 7, 2003 (TW) .............................. 92208371 U

(51) Int. Cl.
*H01M 2/10* (2006.01)
*H05K 5/00* (2006.01)
(52) U.S. Cl. .......................... 429/100; 429/96; 361/679

(58) Field of Classification Search .................. 429/96, 429/98, 99, 100; 361/679, 814; 455/575.1, 455/575.3, 575.4, 575.6, 575.8
See application file for complete search history.

(56) References Cited

U.S. PATENT DOCUMENTS

| 5,436,088 | A | 7/1995 | Castaneda et al. |
| 6,157,545 | A | 12/2000 | Janninck et al. |
| 6,929,878 | B2 * | 8/2005 | Chen et al. .................. 429/100 |
| 7,068,495 | B2 * | 6/2006 | Luo et al. .................... 361/679 |
| 2002/0076607 | A1 * | 6/2002 | Chang ........................ 429/100 |

* cited by examiner

*Primary Examiner*—Patrick Ryan
*Assistant Examiner*—Muhammad Siddiquee
(74) *Attorney, Agent, or Firm*—Wei Te Chung

(57) ABSTRACT

A battery cover assembly includes a battery cover (3) defining a pair of guide rails (326) therein, a connecting member (2), a housing (1) defining a receiving slot (164) and at least a battery-receiving compartment (194), a plurality of springs (5), and an antenna rod (4). The connecting member is slidingly received in the guide rails along a lateral direction, and the antenna rod inserts into the receiving slot through the connecting member and the springs such that the battery cover can rotate about the antenna rod. When the battery cover is rotated downwardly to the housing, a force is required to press the battery cover down upon the housing, and then inwardly along a direction toward the antenna rod until locking projections (302) on the cover catch in troughs (182) defined in the housing.

21 Claims, 6 Drawing Sheets

BATTERY COVER ASSEMBLY FOR PORTABLE ELECTRONIC DEVICE

BACKGROUND OF THE INVENTION

1. Field of the Invention

The present invention generally relates to battery cover assemblies, and more particularly to a battery cover assembly for use in a portable electronic device.

2. Prior Art

As a power source, batteries are widely used in portable electronic devices, such as personal digital assistants (PDAs), cellular phones and so on. Conventional batteries are attachably received in the electronic devices, and battery covers are designed to connect with housings of the electronic devices to package the batteries. The batteries have to be replaced by opening the battery covers when the batteries are damaged or can not be recharged with electricity any more.

A clasp structure or latch structure is used with a conventional battery cover to engage with a housing of a portable electronic device. For example, a cellular phone marked Alcatel OT310 has a latch for the battery cover. The latch comprises a pair of hooks at one end of the battery cover and a locking pin protruding from the other end of the battery cover. Accordingly, a pair of troughs is defined in an end portion of a backside of a housing of the cellular phone, and a locking hole is defined in the other end portion of the backside of the housing. In assembly, the hooks are firstly inserted into the troughs in the backside of the housing. Then, the battery cover is pressed downwardly to the housing until the locking pin on the battery cover is inserted into the locking hole in the backside of the housing. The battery cover is thus assembled to the housing of the cellular phone. The battery cover is simple in structure, and the engagement between the battery cover and the housing of the cellular phone is firm, too. However, during disassembly, the battery cover is susceptible to being damaged, since a greater force is exerted thereon. As a result, it is inconvenient for a user to change a battery in the housing of the cellular phone.

In addition, most conventional battery covers or battery packages are separate from housings of portable electronic devices. The battery covers need to be opened and taken off when changing batteries, and then the battery covers have to be remounted to the housing after the batteries are changed. During the course of changing the batteries, the disassembled battery covers could be lost due to a user's carelessness.

SUMMARY OF THE INVENTION

Accordingly, an object of the present invention is to provide a battery cover assembly which is convenient for a user to open and close, and for which the battery cover is not susceptible to being lost when it is opened.

To achieve the above-mentioned object, a battery cover assembly includes a battery cover defining a pair of guide rails, a connecting member, a housing defining a receiving slot along a longitudinal direction thereof, a plurality of springs, and an antenna rod secured in the receiving slot. The connecting member is slidingly received in the guide rails along a lateral direction, and the antenna rod is longitudinally inserted in the receiving slot through the connecting member and the spring members such that the battery cover can rotate about the antenna rod to different positions. When the battery cover is rotated downwardly to the housing, a predetermined force is required to press the battery cover down, and then a force is required along a direction toward the antenna rod. The battery cover locks into place on the housing when locking projections on the cover engage into troughs on the housing.

DETAILED DESCRIPTION OF THE INVENTION

Figure 1:
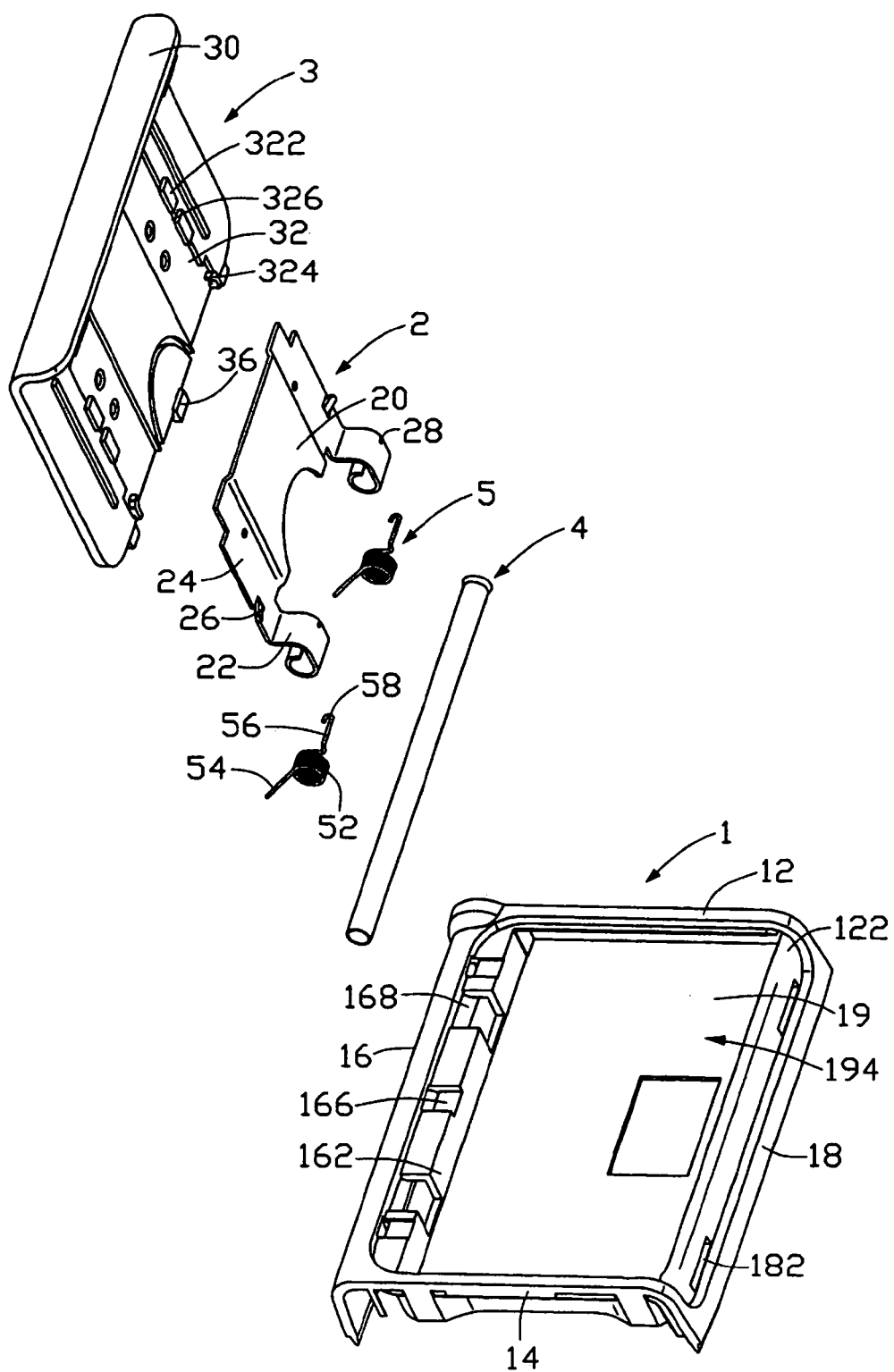
FIG. 1 is an exploded perspective view of a battery cover assembly in accordance with a preferred embodiment of the present invention.
Figure 2:
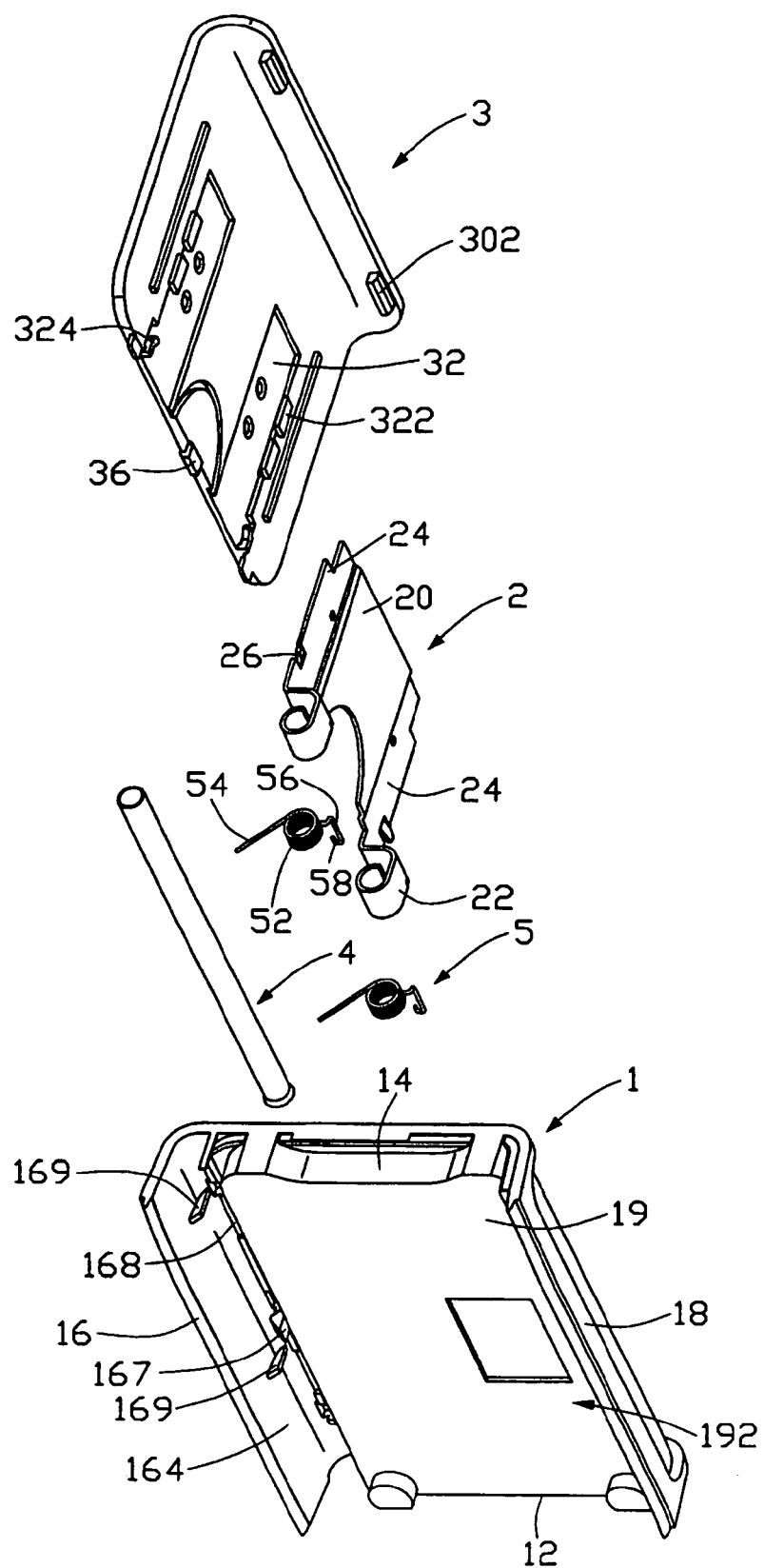
FIG. 2 is an exploded perspective view of the battery cover assembly of FIG. 1, viewed from a different angle.

Referring to FIGS. 1 and 2, a battery cover assembly for use in a mobile phone (not shown) will be taken here as an example to disclose details according to a preferred embodiment of the present invention. The battery cover assembly comprises a housing 1, a connecting member 2, a cover 3, an antenna rod 4, and a plurality of springs 5.

The housing 1 comprises a top wall 12, a bottom wall 14, a left sidewall 16, and a right sidewall 18 together defining a rectangular space (not labeled). The rectangular space is separated into a first compartment 192 and a second compartment 194 by a partition wall 19. The partition wall 19 is formed at an intermediate position between an upper surface (not labeled) and a lower surface (not labeled) of the housing 1. An inner wall 162 protrudes from the partition wall 19, and connects against the left sidewall 16. The first compartment 192 is for accommodating electronic components, such as a printed circuit board therein after assembly of the housing 1 with other housings (not shown) of the cellular phone. The second compartment 194 is used to receive batteries or a battery package therein. The left sidewall 16 and the inner wall 162 define a plurality of mounting grooves 166 and a plurality of rectangular openings 168 therein which alternate with the mounting grooves 166. A receiving slot 164 is defined in the first compartment 192 at a position corresponding to the mounting grooves 166 and the rectangular openings 168, for receiving the antenna rod 4. An elongated recess 122 is defined in an outside surface (not labeled) of the right sidewall 18. A pair of troughs 182 is defined in the recess 122, and the troughs 182 are located near the top wall 12 and the bottom wall 14, respectively. A plurality of positioning projections 167 extends from a bottom of the receiving slot 164, and a pair of tabs 169 extends from the bottom of the receiving slot 164, near the plurality of positioning projections 167.

The connecting member 2 is made of elastic material, such as metal material, by way of stamping. The connecting member 2 comprises a main body 20 and a pair of side wings 24 extending from two opposite sides of the main body 20. The pair of side wings 24 is in one plane, which is lower than the plane of the main body 20. A hook-shaped folding arm 22 extends from a longitudinal end of each side wings 24. A positioning hole 28 is defined in each folding arm 22. An elastic latch 26 is formed on and extends beyond an outside edge of each side wing 24.

Figure 5:
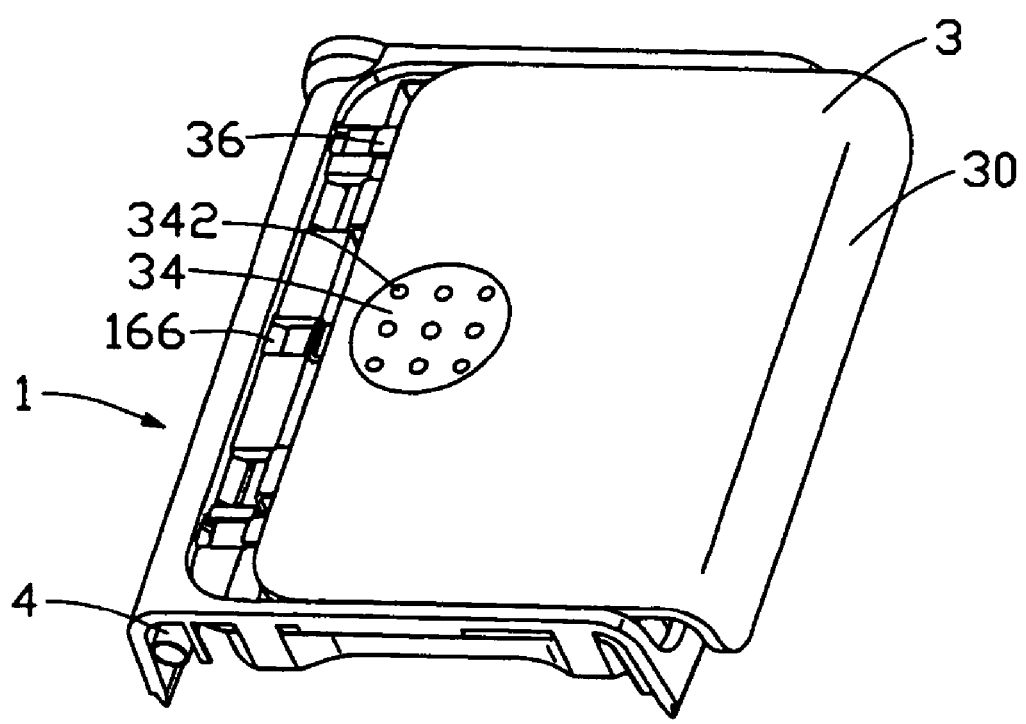
FIG. 5 is a perspective view of the assembled battery cover assembly, in which the cover is about to cover a housing of the battery cover assembly.

The cover 3 is substantially rectangular in shape and comprises a sidewall 30 extending from a longitudinal side thereof. Two parallel, elongated recesses 32 are defined along a lateral direction in an inner side of the cover 3, spaced from each other a certain distance. A plurality of protruding blocks 322 is formed adjacent to an outside edge of each recess 32, protruding from the inner side of the cover 3. The plurality of protruding blocks 322 extends to hang over each recess 32, defining a pair of guide rails 326 for slideably receiving the side wings 24 of the connecting member 2. A block 324 extends from a bottom surface of each recess 32 at a proximal side of the cover 3. A distance from each block 324 to a closest lateral side of the cover 3 is slightly smaller than a distance from an outside edge (not labeled) of the recess 32 to the same lateral side of the cover 3. Two locking projections 302 protrude from an inner surface of the sidewall 30 to engage with the pair of troughs 182 defined in the recess 122 of the housing 1. Referring to FIG. 5, a circular pressing portion 34 is formed on an outside surface of the cover 3, adjacent to a longitudinal side of the cover 3 opposite the side from which the sidewall 30 depends. A plurality of nipples 342 protrudes from an outside surface of the pressing portion 34 to increase a frictional force when the pressing portion 34 is pressed. A plurality of mounting protrusions 36 extends from the side of the cover 3 which is opposite to the sidewall 30.

The antenna rod 4 is hollow and is secured within the receiving slot 164 by a positioning means (not shown). The antenna rod 4 is known in many portable electronic devices which having antennas.

Each spring 5 comprises a coil-shaped body 52, a first end portion 54 extending along a tangent to the coil-shaped body 52, and a second end portion 56 extending parallel to a longitudinal axis of the coil-shaped body 52. A hook 58 is formed on an end of the second end portion 56.

Figure 3:
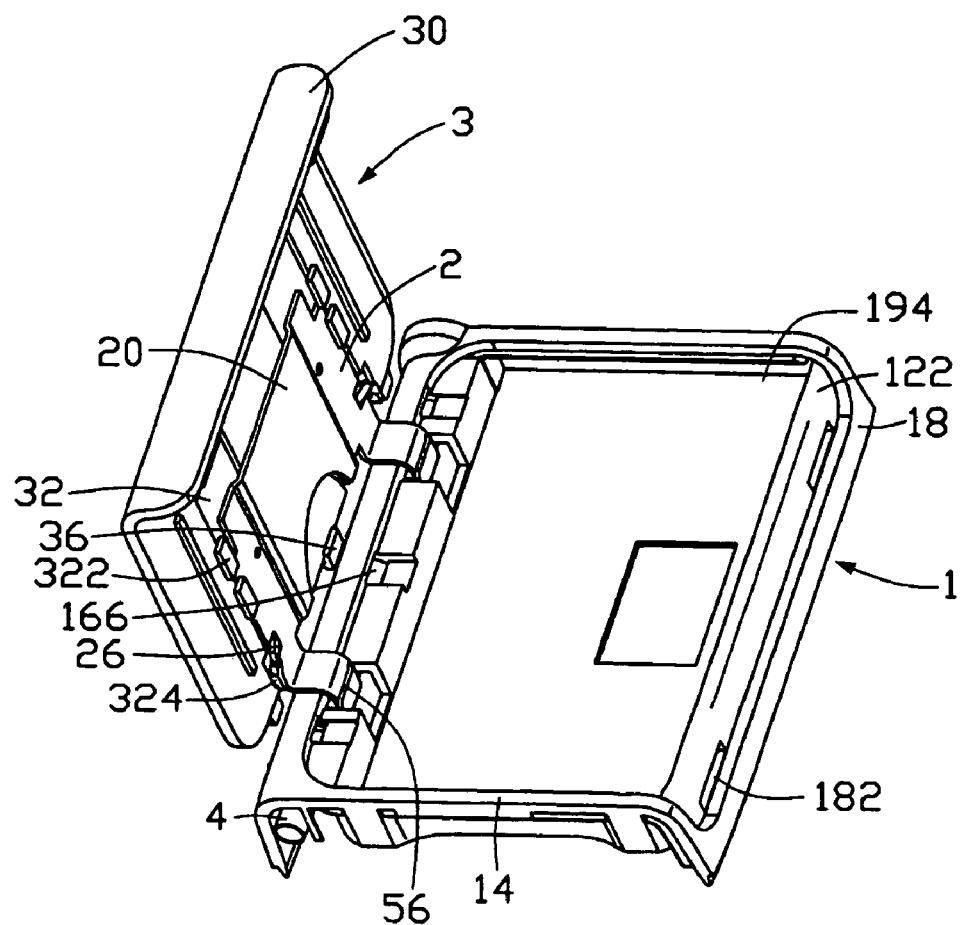
FIG. 3 is a perspective view of an assembled battery cover assembly, in which a cover is in an open position.
Figure 4:
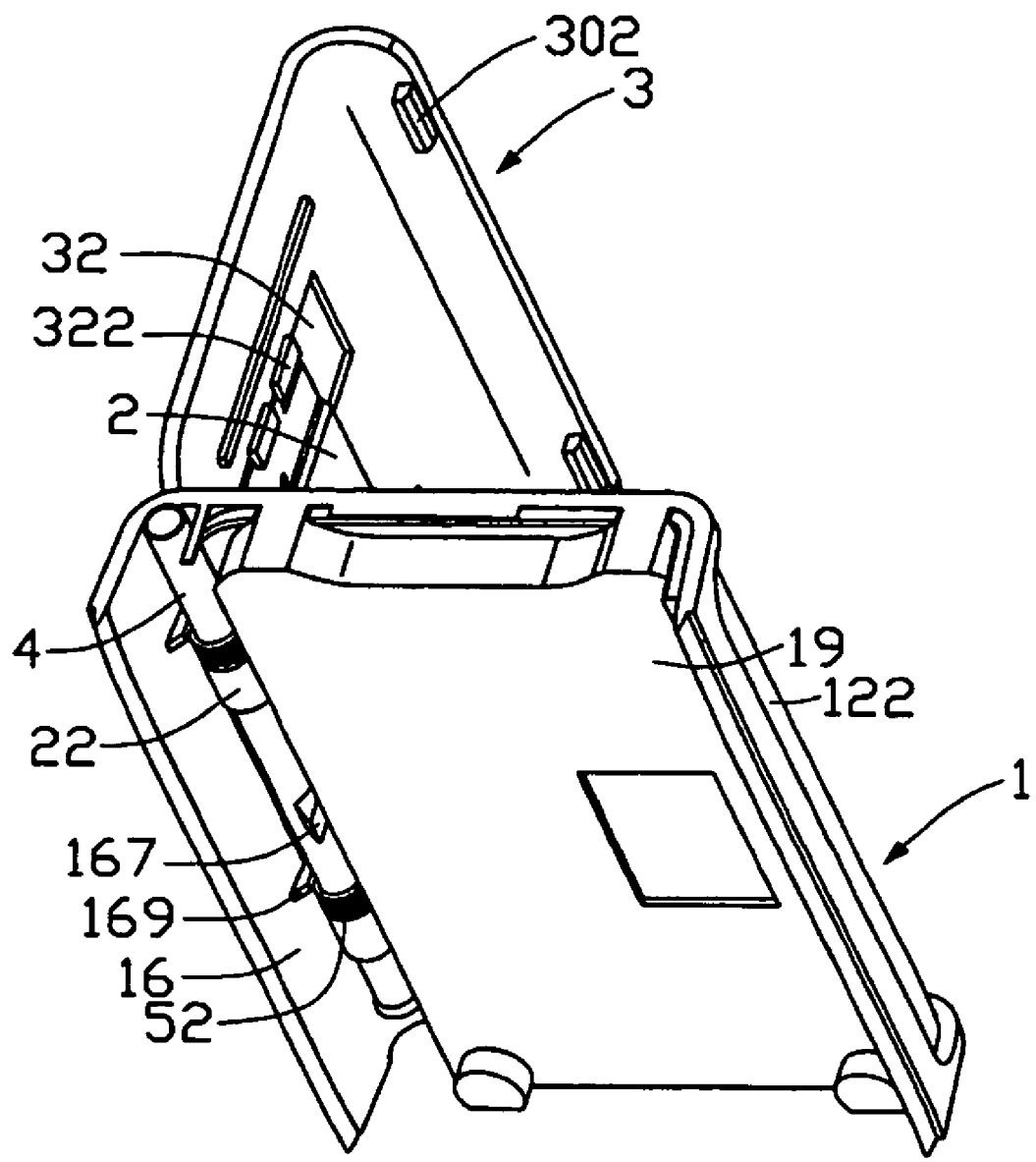
FIG. 4 is a perspective view of the assembled battery cover assembly of FIG. 3, viewed from a different angle.

Referring to FIGS. 3 and 4, in assembly, the connecting member 2 is assembled to the cover 3 with the pair of side wings 24 being inserted into the guide rails 326 defined by the protruding blocks 322 and the recesses 32. During the course of inserting the side wings 24 into the guide rails 326, the elastic latch 26 on each side wing 24 is deflected by the block 324 located at an entrance of the corresponding guide rail 326. The elastic latch 26 returns to its original position when each side wing 24 is completely received in the corresponding guide rail 326. The guide rails 326 are slightly longer than that of the side wings 24, so that the connecting member 2 can move back and forth in a small range. However, the connecting member 2 is prevented from moving out of the guide rails 326 by the elastic latches 26 bumping against the blocks 324.

The folding arms 22 of the connecting member 2 are then inserted into the rectangular openings 168 defined in the inner wall 162 of the housing 1. Each of the springs 5 is then disposed between the corresponding tab 169 protruding into the receiving slot 164 and the corresponding folding arm 22 protruding into the receiving slot 164, with each first end portion 54 abutting against a corresponding tab 169 and the hook 58 of each second end portion 56 engaging with the positioning hole 28 of the corresponding folding arm 22. After that, the antenna rod 4 is inserted through an entrance of the receiving slot 164, through one of the folding arm 22, through one of the springs 5, alongside the positioning projections 167, through the other folding arm 22, and through the other spring 5. The diameter of the antenna rod 4 is slightly greater than that of the coils of the springs so that a particular tool is required to realize this assembly. The antenna rod 4 is thus secured in the receiving slot 164 by the connecting member 2, the springs 5, the positioning projections 167, and the tabs 169.

Figure 6:
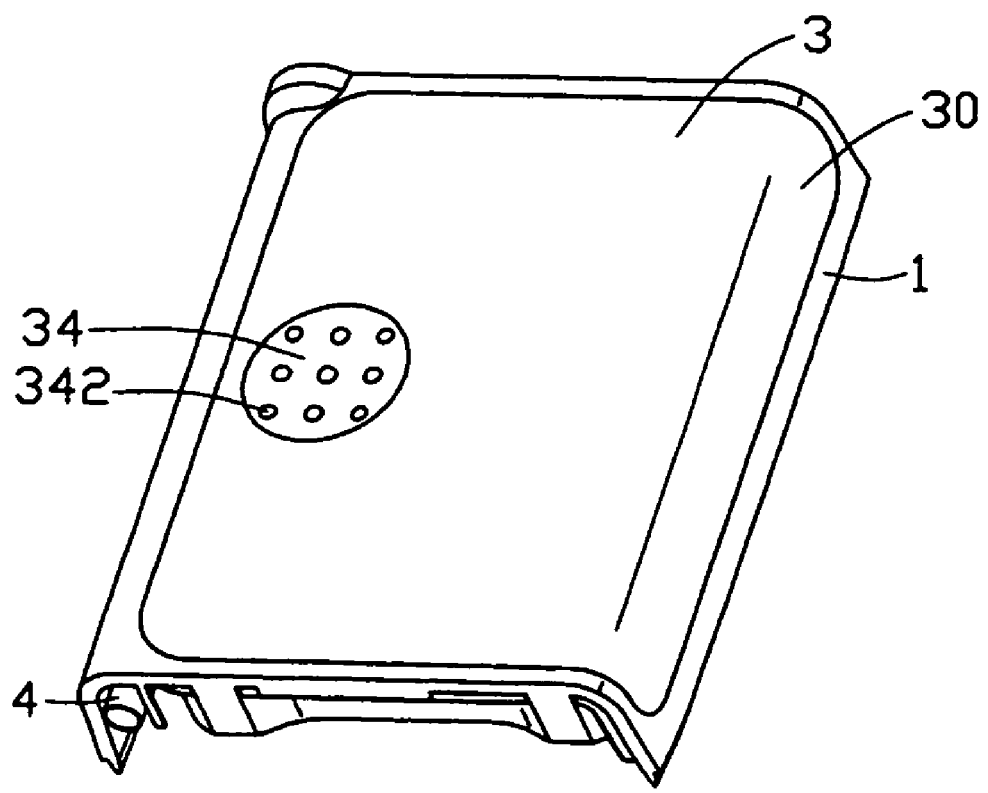
FIG. 6 is a perspective view of the assembled battery cover assembly, in which the cover is in a closed position, covering the housing.

Referring to FIG. 3, a battery package (not shown) is put into the second compartment 194 when the cover 3 is in an open position. Then, the cover 3 together with the connecting member 2 is rotated downwardly about the antenna rod 4 to the housing 1. In this process, a certain force is required to be exerted on the pressing portion 34 of the battery cover 3 to overcome the spring force produced by the springs 5. When the cover 3 is rotated to a status as shown in FIG. 5, wherein the housing 1 is covered by the cover 3. The mounting protrusions 36 are inserted into the mounting grooves 166 and the locking projections 302 are inserted into the troughs 182 when the cover 3 is pushed along a direction toward the antenna rod 4. Referring to FIG. 6, the battery package is thus received in the second compartment 194, and the housing 1 is completely covered by the cover 3, since the sidewall 30 of the cover 3 is received in the recess 122 of the housing 1.

To take the battery package out of the second compartment 194, the pressing portion 34 is pushed to move the cover 3 along a direction away from the antenna rod 4. Then, the mounting protrusions 36 are disengaged from the mounting grooves 166 and the locking projections 302 are disengaged from the troughs 182 when the cover 3 is moved a certain distance relative to the connecting member 2 under the pushing force. Finally, the cover 3 is rotated back to the open position under the spring force produced by the springs 5. The cover 3 is thus opened and the battery package can be removed.

Compared with other battery cover assemblies in the prior art, the battery cover 3 is not easy as easily lost when it is opened to change the battery package, since the battery cover 3 is rotatably connected to the housing 1. It is also convenient for a user to open and close the battery cover 3.

It is believed that the present invention and its advantages will be understood from the foregoing description and it will be apparent that various changes may be made thereto without departing from the spirit and scope of the invention or sacrificing all of its material advantages, the examples hereinbefore described merely being preferred or exemplary embodiments of the invention.

We claim:

1. A battery cover assembly for use in a portable electronic device, comprising:
   a battery cover;
   a connecting member slidingly connected to said battery cover;
   a housing defining a receiving slot and at least a compartment for accommodating a battery package; and
   a rod member received in said receiving slot; wherein said connecting member is rotatably connected to said housing by said rod member such that said battery cover is rotated to different positions around said rod member.

2. The battery cover assembly of claim 1, further comprising a plurality of spring members engaging with said rod member and said connecting member.

3. The battery cover assembly of claim 1, wherein said battery cover comprises a sidewall extending one side thereof, and a plurality of locking projections protrudes from an inner surface of said sidewall.

4. The battery cover assembly of claim 3, wherein said housing is defined by a top wall, a bottom wall, a left wall, a right wall, and a partition wall, an elongated recess is defined in an outside surface of said right wall, and a plurality of troughs is defined in said elongated recess for receiving said plurality of locking projections of said sidewall of said battery cover.

5. The battery cover assembly of claim 1, wherein an elongated recess is defined along a lateral direction in an inner side of said battery cover, a plurality of protruding blocks protrudes from said inner side of said battery cover, adjacent to said recess, and a guide rail is defined by said protruding blocks and said recess.

6. The battery cover assembly of claim 1, wherein said connecting member comprises a main body and a pair of side wings extending from two opposite sides of said main body.

7. The battery cover assembly of claim 6, wherein said a pair of side wings is in one plane which is lower than said plane of said main body.

8. The battery cover assembly of claim 7, wherein a hook-shaped folding arm extends from a longitudinal end of each of said side wings.

9. The battery cover assembly of claim 8, wherein a positioning hole is defined in each of said hook-shaped folding arms.

10. The battery cover assembly of claim 9, wherein an elastic latch is formed on and extends beyond an outside edge of each said side wings.

11. The battery cover assembly of claim 2, wherein each of said spring members comprises a coil-shaped body, a first end portion extending along a tangent of said coil-shaped body, and a second end portion extending along a direction parallel to a longitudinal axis of said coil-shaped body.

12. The battery cover assembly of claim 11, wherein a hook is formed with said second end portion.

13. A battery cover assembly for use in a portable electronic device, comprising:
a battery cover;
a connecting member connected to said battery cover;
a housing formed of a plurality of sidewalls and defining a receiving slot and at least a compartment for accommodating a battery package; and
a rod member secured in said receiving slot; wherein
said connecting member is slidingly engaged with said battery cover along a direction perpendicular to an axis of said rod member, and said connecting member is rotatably connected with said rod member such that said battery cover is rotated to different positions around said rod member.

14. The battery cover assembly of claim 13, wherein a plurality of locking projections protrudes frown said battery cover, and a plurality of corresponding locking troughs are defined in one of said sidewalls of said housing.

15. A battery cover assembly, comprising:
a battery cover defining a guide rail;
a connecting member being slidably received in said guide rail along a lateral direction;
a housing defining a receiving slot along a longitudinal direction perpendicular to said lateral direction and at least a compartment for receiving a battery package; and
a rod member secured in said receiving slot; wherein
said connecting member is engaged with said rod member such that said connecting member can rotate about said rod member to different positions.

16. The battery cover assembly of claim 15, further comprising a plurality of spring members 17. The battery cover assembly of claim 16, wherein each of said spring members comprises a coil-shaped body, a first end portion, and a second end portion extending from said coil-shaped body.

18. A battery cover assembly comprising:
a housing defining a space for accommodating a battery package:
a connecting member rotatably connected to said housing;
an axis about which said connecting member is rotated relative to said housing, said axis extending along a longitudinal direction; and
a battery cover slidably connected to said connecting member in a lateral direction perpendicular to said longitudinal direction, and adapted to cover an opening of said space; wherein
said battery cover is moved toward said axis to lock to said housing and away from said axis to escape from said housing and rotate upward to expose said space.

19. The battery cover assembly of claim 13, wherein said connecting member comprises a main body and a pair of side wings extending from two opposite sides of said main body, and a positioning hole is defined in each of said side wing.

20. The battery cover assembly of claim 19, wherein a hook-shaped folding arm extends from a longitudinal end of each of said side wings, and said positioning hole is defined in each folding arm.

21. The battery cover assembly of claim 13, wherein said connecting member comprises a main body and a pair of side wings extending from two opposite sides of said main body, and an elastic latch is formed on and extends beyond an outside edge of each of said side wings.

* * * * *